United States Patent [19]

Bennett et al.

[11] Patent Number: 5,015,325
[45] Date of Patent: May 14, 1991

[54] PERFORATING MEANS FOR APPARATUS FOR HEAT-SEALING THERMOPLASTIC SHEETING

[76] Inventors: Charles J. Bennett, Rte. 2, Box 154; Billy J. Simpson, Sr., Rte. 1, Box 337, both of, Oakboro, N.C. 28129

[21] Appl. No.: 439,646

[22] Filed: Nov. 20, 1989

[51] Int. Cl.$^5$ ............................................. B32B 31/18
[52] U.S. Cl. .................................. 156/513; 156/251; 156/252; 156/253; 156/515; 156/583.2; 156/583.8; 156/583.9; 493/189; 493/199; 493/203; 493/209
[58] Field of Search .................. 156/87, 251, 252, 253, 156/513, 515, 518, 530, 583.2, 583.8, 583.9; 493/189, 199, 200, 203, 206, 209

[56] References Cited

U.S. PATENT DOCUMENTS

| | | |
|---|---|---|
| Re. 30,010 | 5/1979 | Shanklin . |
| 2,414,157 | 1/1947 | Marziani ............................ 156/513 |
| 2,591,935 | 4/1952 | Heigl ................................. 156/513 |
| 2,613,488 | 10/1952 | Attride ................................. 53/58 |
| 2,668,403 | 2/1954 | Rumsey .............................. 493/203 |
| 3,015,600 | 1/1962 | Cook ................................. 156/356 |
| 3,047,991 | 8/1962 | Siegel et al. ...................... 493/203 |
| 3,116,394 | 12/1963 | Barton ................................ 219/19 |
| 3,135,077 | 6/1964 | Siegel et al. ...................... 493/203 |
| 3,191,356 | 6/1965 | Zelnick et al. .................... 493/203 |
| 3,194,124 | 7/1965 | Warp ................................. 493/199 |
| 3,200,561 | 8/1965 | Siegel et al. . |
| 3,222,800 | 12/1965 | Siegel et al. . |
| 3,239,993 | 3/1966 | Cherrin . |
| 3,243,330 | 3/1966 | Zelnick . |
| 3,253,122 | 5/1966 | Kochner et al. . |
| 3,291,963 | 12/1966 | Wetzel . |
| 3,299,251 | 1/1967 | Zelnick . |
| 3,312,811 | 4/1967 | Shanklin . |
| 3,316,653 | 5/1967 | Zelnick . |
| 3,321,353 | 5/1967 | Zelnick . |
| 3,339,465 | 9/1967 | Laub ................................... 493/203 |
| 3,347,729 | 10/1967 | Seefluth . |
| 3,428,512 | 2/1969 | Cooper . |
| 3,429,100 | 2/1969 | Zelnick et al. . |
| 3,450,587 | 6/1969 | Beason et al. . |
| 3,490,981 | 1/1970 | Shanklin . |
| 3,653,177 | 4/1972 | Adams et al. . |
| 3,909,334 | 9/1975 | Verbeke . |
| 3,974,958 | 8/1976 | Ruda ................................... 493/189 |
| 4,035,983 | 7/1977 | Shanklin et al. . |
| 4,082,941 | 4/1978 | Sukow et al. . |
| 4,219,988 | 9/1980 | Shanklin et al. . |
| 4,221,626 | 9/1980 | Clay . |
| 4,339,093 | 7/1982 | Shanklin et al. . |
| 4,447,284 | 5/1984 | Shanklin et al. . |
| 4,532,753 | 8/1985 | Kovacs . |
| 4,650,535 | 3/1987 | Bennett et al. .................... 156/583.9 |
| 4,719,741 | 1/1988 | Mabry . |

FOREIGN PATENT DOCUMENTS 2041074 2/1972 Fed. Rep. of Germany ...... 493/209

*Primary Examiner*—Caleb Weston
*Attorney, Agent, or Firm*—Shefte, Pinckney & Sawyer

[57] ABSTRACT

In a L-sealer for heat-sealing center-folded thermoplastic film, wherein a pair of relatively movable clamping jaws grip and heat seal the facing film webs along an L-shaped seal line, a series of perforating pins are mounted to one clamping jaw to perforate the film webs closely adjacent the seal line. The perforations allow escape of air when the film is subsequently shrunk, the close spacing of the perforations to the seal line insuring that the perforations are disposed at the side of the packaged article when the film is shrunk to minimize entry of dirt and the like.

16 Claims, 2 Drawing Sheets

PERFORATING MEANS FOR APPARATUS FOR HEAT-SEALING THERMOPLASTIC SHEETING

BACKGROUND OF THE INVENTION

The present invention relates generally to apparatus for heat-sealing thermoplastic sheeting and, more particularly, to such apparatus of the so-called L-sealer type adapted for use in packaging articles in heat-shrinkable plastic film.

In recent years, it has become increasingly popular and commonplace to package many commercial articles in close-fitting transparent plastic film. This packaging is accomplished conventionally by wrapping the article to be packaged loosely in a heat-shrinkable plastic film, sealing together the abutting edges of the film to enclose the article, and subjecting the package to sufficient heat to activate shrinkage of the film tightly about the article.

Machines commonly referred to as L-sealers are available for commercially accomplishing the preliminary wrapping procedure as above-described. Heat shrinkable plastic film in continuous sheets pre-folded along a central longitudinal edge and packaged in convenient rolled form is utilized for this purpose. L-sealing machines characteristically provide a sealing table for supporting the plastic film with the article inserted between the folds of the film and a pair of L-shaped jaws at the table adapted for receiving and grippingly engaging the film therebetween. One of the jaws is provided with a heated wire sealing arrangement to simultaneously sever and seal the film along a continuous L-shaped seal line extending parallel to the folded edge of the film and transversely between the parallel seal extent and the folded edge. In continuous operation, the transverse seal formed in making each package provides the initial transverse seal for the next package so that each described L-sealing operation provides complete package formation. Representative examples of L-sealing equipment of the described type are found U.S. Pat. Nos. 3,347,729; 3,490,981; 4,035,983; 4,650,535 and U.S. Pat. No. Re. 30,010. A more sophisticated L-sealing apparatus adapted for automatic high speed operation is disclosed in U.S. Pat. No. 4,219,988.

The operation of heating the package formed in the L-sealing operation is carried out in a machine commonly referred to as a shrink tunnel. Basically, such machines provide a substantially enclosed heating chamber through which travels a driven conveyor belt to transport the L-sealed packages through the heating chamber for shrinkage of the plastic film. Representative examples of shrink tunnels of this basic type are disclosed in U.S. Pat. Nos. 3,222,800; 3,312,811; and 3,316,653. Additionally, U.S. Pat. No. 3,200,561 discloses a similar plastic film heat-shrinking machine which does not utilize a substantially enclosed heat chamber but instead relies on a forced flow of heated air across the traveling conveyor.

As will be understood, the wrapping and sealing of an article within plastic film in the L-sealing operation serves to capture at least some quantity of air within the package enclosure defined by the sealed film. During the subsequent heat shrinking process, this captured air must be permitted to escape to prevent bursting of the film package. It is therefore conventional practice to provide a mechanism for punching holes at periodic intervals in the folded film as it is unwound from its roll during delivery to the L-sealer, the holes being formed at sufficiently close spacings along the length of the film to insure a minimum of one or more holes in each film package formed in the L-sealing operation. Typically, the holes are formed of a diameter of approximately one-quarter inch.

While this hole punching operation serves the intended purpose of permitting air escape during subsequent film shrinking, the holes in the film tend to permit entry of dirt and debris into the package which may soil the packaged article, thereby negating one of the principal objectives to be achieved by the overall film wrapping procedure. Invariably, a significant proportion of the packages produced have the holes located in the portions of the film covering the top and bottom surfaces of the enclosed article. Thus, dirt and debris on the conveyor of the heat shrinking machine may soil the article as it is subjected to the shrinking operation. Furthermore, the holes necessarily remain in the film of the finished package following the shrinking operation, the holes often being larger than originally formed, whereby an even greater risk exists of soiling by dirt and debris entering the package through the holes during subsequent handling of the finished package.

SUMMARY OF THE INVENTION

It is accordingly an object of the present invention to provide an improved perforating mechanism for apparatus for heat sealing thermoplastic sheeting, particularly L-sealers, which enables the location of formation of the necessary air escape perforations to be precisely determined and controlled so as to minimize the risk of soiling of the package either during the heat shrinking operation or thereafter.

Basically, the improvement of the present invention is adapted for use in any sealing apparatus of the type operable for heat-sealing together facing webs of shrinkable thermoplastic sheeting to enclose an article between the webs. This type of sealing apparatus typically includes a pair of sheet clamping jaws one of which is provided with a sheet heating arrangement. The jaws are relatively movable into and out of adjacent clamping relation for gripping the facing webs of the sheeting between the jaws and heat sealing the webs by the heating arrangement along a seal line sidewise adjacent the enclosed article. According to the present invention, an arrangement is mounted to one of the jaws for forming at least one perforation in at least one of the webs of the sheeting at a predetermined spacing from the seal line when the jaws are moved into clamping relation, the perforation being for the purpose of permitting escape of air when the sheeting is subsequently shrunk. The spacing of the perforation from the seal line is selected to dispose the perforation at the side of the article when the sheeting is shrunk in order to minimize passage through the perforation of dirt and the like which may soil the article.

In the preferred embodiment, the perforation forming arrangement includes a plurality of pins mounted at spacings along the one jaw for penetrating each web of the sheeting, with a compatible arrangement mounted to the other jaw for receiving the pins when the jaws are in clamping relation. The pins are arranged on the one jaw to locate the perforations closely adjacent the seal line. A cover is also mounted to the one jaw for movement between a guard position at least partially covering the pins when the jaws are out of clamping relation and a retracted position exposing the pins when the jaws are in clamping relation. A spring arrangement or the like is provided for biasing the cover into its guard position.

In the preferred embodiment, the perforation forming arrangement is incorporated in a sealing apparatus of the L-sealer type adapted for heat sealing a folded thermoplastic film. L-sealers typically include a pair of sheet clamping jaws one of which has an L-shaped sealing bed and the other of which has a correspondingly L-shaped sheet heating arrangement. One saw is movable relatively toward and away from the other jaw into and out of adjacent clamping relation to grip and heat seal the facing webs of the thermoplastic film along an L-shaped seal line extending sidewise adjacent the article along a first extent opposite the fold and along a transverse extent between the fold and the first sealed extent. In this embodiment, the perforation forming arrangement is mounted at a disposition on the jaw having the sheet heating means so as to locate the perforations closely adjacent the transverse extent of the seal line.

DESCRIPTION OF THE PREFERRED EMBODIMENT

Referring now to the accompanying drawings, the perforation forming arrangement of the present invention is herein illustrated and described as embodied in an L-sealing apparatus of the type described and illustrated in the aforementioned U.S. Pat. No. 4,650,535. The basic construction and operation of the L-sealing apparatus of such patent is herein described and illustrated only to the extent reasonably necessary to facilitate a complete and enabling disclosure and understanding of the present invention. Furthermore, as those persons skilled in the art will readily recognize, the present invention is equally well adapted to be embodied in other apparatus for heat sealing thermoplastic film and sheeting material and, accordingly, the disclosure herein of the present invention as preferably embodied in an L-sealing apparatus is only illustrative for the purpose of providing a full and enabling disclosure of the present invention and is not to be construed as a limitation on the present invention.

Figure 1:
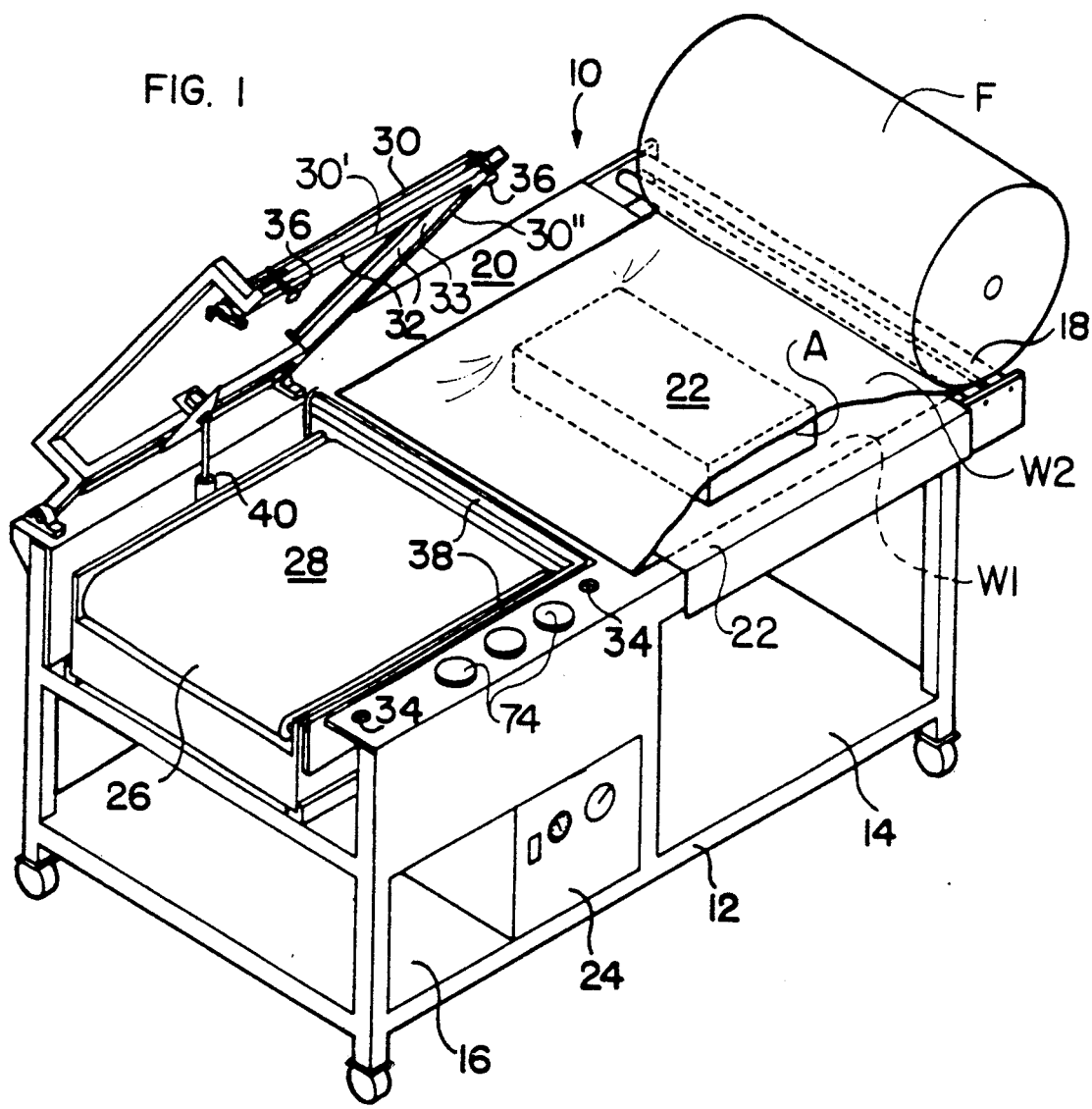
FIG. 1 is an overall perspective view of an L-sealing apparatus embodying the improved perforation forming arrangement of the present invention, showing its sheet clamping jaws in their spaced-apart open position.

With reference initially to FIG. 1, an L-sealing apparatus is shown generally at 10 and basically includes a frame 12 having a table-like section 14 at one end thereof forming a packaging area and a cabinet-like section 16 at the other end thereof for housing and supporting the sealing components to form a sealing area.

A film supporting and dispensing mechanism 18 is mounted to the frame 12 at the end of the packaging table section 14 for rotatably supporting a conventional roll F of center-folded heat-shrinkable thermoplastic film, or another suitable heat sealable plastic sheeting, for rotational off-winding of the film F.

The packaging table section 14 of the frame 12 has a horizontal planar top panel 20 and another planar panel 22 mounted in parallel relation therewith at a slight spacing above the top panel 20 sufficient to permit passage of one folded web W1 of the film F between the panels 20, 22 while the other folded web W2 of the film F is passed over the top surface of the panel 22, whereby the panel 22 forms a packaging table surface. An article A to be wrapped with the film F may thus be placed on the top surface of the panel 22 beneath the upper web W2 to dispose the article A between the facing webs W1, W2 of the film F preparatory to heat sealing of the film F as described below.

The cabinet section 16 of the frame 12 includes a box-like lower enclosure 24 for containing most of the electrical components of the apparatus. The remainder of the cabinet section 16 is generally enclosed at its front, rear and central sides to define an open-top channel area above the box-like enclosure 24 within which a sealing conveyor table 26 is housed. The conveyor table 26 has a motor-driven endless conveyor belt 28 having a horizontal top run arranged to extend generally coplanarly with and to move endwardly away from the packaging table section 14.

Figure 2:
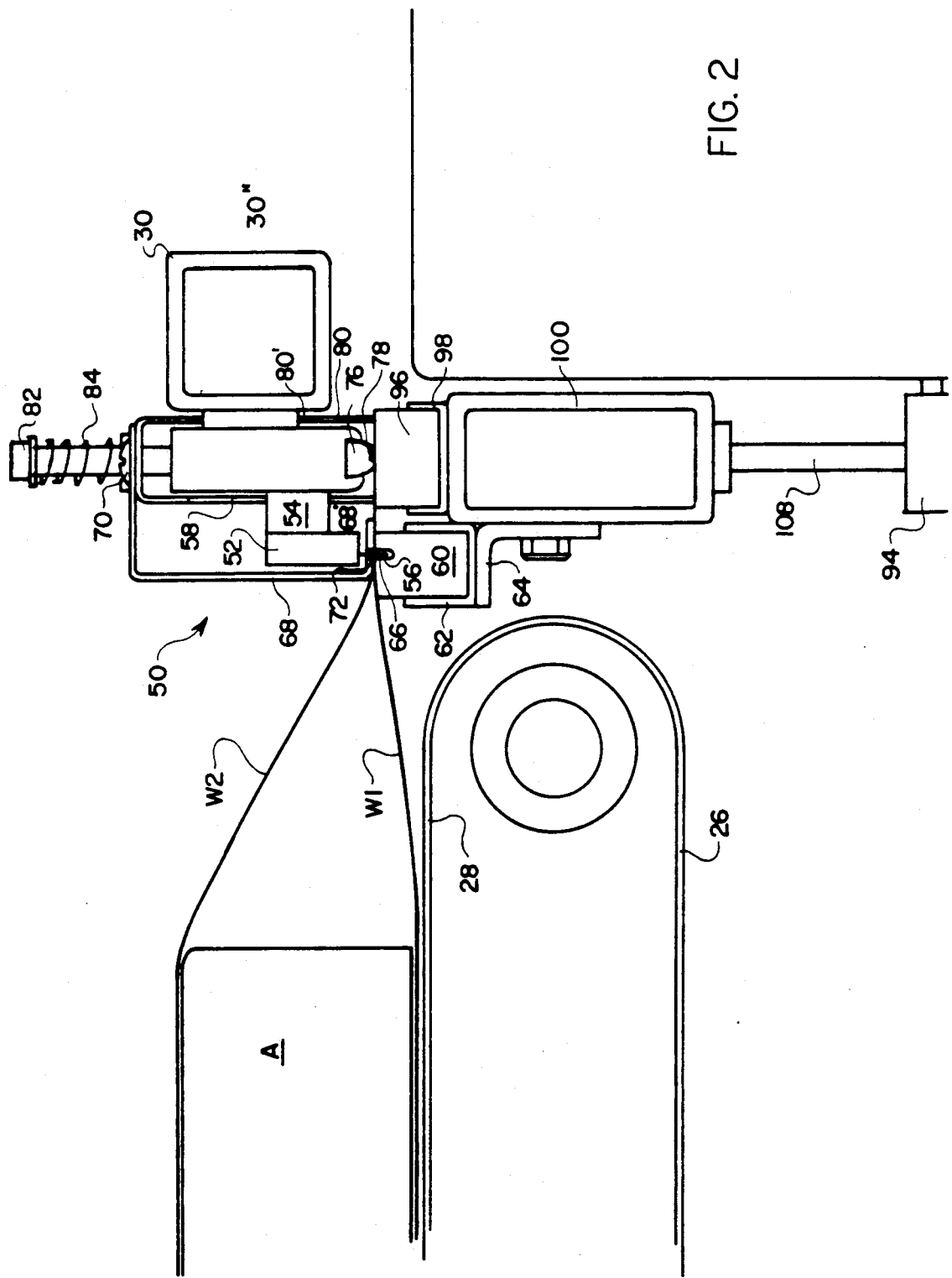
FIG. 2 is a vertical cross-sectional view taken along line 2—2 of the L-sealing apparatus of FIG. 1, showing the sheet clamping jaws thereof in their closed clamping position.

A sealing arm assembly 30 formed of square tubing welded in a generally rectangular configuration is pivotably mounted to the frame 12 along the upper rearward side of the cabinet section 16 for pivotal movement upwardly and downwardly relative to the frame 12 between an upward position spaced apart from the frame 12 and a downward position adjacent the frame 12. The free outward side 30" of the sealing arm 30 opposite the pivoted side and the adjacent transverse side 30" of the arm 30 extending transversely therebetween at the center of the frame 12 have respective conventional impulse-type wire heating assemblies 32, 33 attached to the inward surfaces of the sides 30', 30" of the arm 30 in juxtaposed end-to-end abutment at the common corner of the sealing arm 30 to form an L-shaped heat sealing arrangement. Essentially, each wire heating assembly 32, 33 includes a bed pad 76 rigidly affixed to the inward surface of the respective side 30', 30" of the sealing arm assembly 30, with a resistance-heated metal wire 78 trained tautly along the lower surface of the bed pad 76, all as best seen in FIG. 2. The wires 78 are electrically heated from a central power supply circuit (not shown) of the L-sealer 10. Each wire heating assembly 32, 33 further includes an inverted U-shaped guard 80 disposed in covering relation over the respective bed pad 76 along substantially the full length thereof. A pair of bolts 82 are rigidly affixed to each bed pad 76 at a spacing therealong and extend upwardly therefrom through corresponding openings in the guard 80 to guide movement of the guard 80 upwardly and downwardly relative to the bed pad 76. A coil spring 84 is disposed about each bolt 82 between its bolt head 82" and the upper surface of the guard 80 to bias the guard 80 into a disposition resting on the bed pad 76 wherein the lateral sides of the guard 80 shield the heating wire 78.

A pair of electromagnets 34 are mounted at opposite ends of the upper front surface of the cabinet section 16 and a pair of metal armature disks 36 are affixed at the opposite ends of the forward free side 30' of the sealing arm assembly 30 for latching engagement of the sealing arm assembly 30 by the electromagnets 34 to hold the sealing arm assembly 30 essentially rigid and fixed when in its downwardly pivoted disposition.

An L-shaped sealing bed assembly 38 is supported at its opposite ends and intermediately at its corner respectively on the piston rods 108 of three piston-and-cylinder assemblies 94 mounted in upstanding disposition to the frame 12 within the channel area of the cabinet section 16 for disposition of the sealing bed assembly 38 extending inwardly along the forward and central margins of the channel area wherein the sealing bed assembly 38 is positioned immediately beneath the wire heating assemblies 32, 33 of the sealing arm assembly 30 when in its downward position adjacent the frame 12. The sealing bed assembly 38 includes two linear seal pad sections 96 covered with a heat resistant material and mounted in juxtaposed L-shaped end-to-end relation within a channel member 98 at the top surface of a correspondingly L-shaped support member 100. Thus, the sealing bed assembly 38 is adapted to assume varied orientations with respect to the frame 12 and the sealing arm assembly 30 by the varied extension of the piston rods 108 of the piston-and-cylinder assemblies 94 to bring the seal pads 96 into abutted clamping relation to the bed pads 76 of the wire heating assemblies 32, 33 of the sealing arm assembly 30 when in its downward position adjacent to the frame 12.

Another piston-and-cylinder assembly 40 is pivotably mounted to the rear wall of the cabinet section 16 of the frame 12 centrally within the channel area thereof for actuating pivotal movement of the sealing arm assembly 30 upwardly and downwardly with respect to the frame 12 for movement into and out of its aforedescribed upward and downward dispositions.

Each of the three piston-and-cylinder assemblies 94 associated with the sealing bed assembly 38 and the piston-and-cylinder assembly 40 associated with the sealing arm assembly 30 are of the so-called double-acting type adapted for compressed air operation. The L-sealing apparatus includes a source of compressed air (not shown) with an air flow control circuitry including suitable solenoid valves for controlling the flow of compressed air from the source respectively to the piston-and-cylinder assemblies 94, 40 as determined by the actuation and deactuation of the solenoid valves by the electrical control circuitry of the L-sealer 10.

According to the present invention, a film perforating assembly, generally indicated at 50 in FIG. 2, is affixed to the transverse side 30" of the sealing arm assembly 30 for penetrating and forming perforations in the webs W1, W2 of the film F during each sealing operation when the sealing arm assembly 30 is brought into its downward position in clamping relation to the sealing bed assembly 38. The film perforation assembly 50 includes a longitudinal header 52 affixed by a pair of spacer elements 54 to the inward side of the bed pad 76 of the wire heating assembly 33, the header 52 having a series of needle-like pins 56 extending downwardly from the underside of the header 52 at spacings along its length. The spacer elements 54 extend laterally from the bed pad 76 of the wire heating assembly 33 through elongated vertical slots 80' in the guard 80 so that its relative movement to the bed pad 76 as aforedescribed is unrestricted. The lateral dimension of the spacers 54 is selected to position the series of pins 56 at a predetermined lateral spacing from the sealing wire 78 of the wire heating assembly 33.

An elongated cushion 60 is supported by a U-shaped channel member 62 on an angle bracket 64 affixed to the laterally inward side of the support member 100 of the sealing bed assembly 38 to extend along its length immediately beneath the header 52 when the sealing arm assembly 30 is in its downward disposition. The cushion 60 is formed with a series of pin holes 66 spaced along its length corresponding in number and spacing to the pins 56 for receiving the pins 56 when the sealing arm assembly 30 is in its downward disposition.

A C-shaped elongate guard plate 68 is affixed by screws 70 to the guard 80 to be movable therewith relative to the bed pad 76 of the wire heating assembly 33. The guard plate 68 substantially encloses the header 52 with the lower leg 68' of the guard plate 68 extending beneath the header 52 to substantially cover the pins 56 when the guards 68, 80 are disposed in their normal disposition biased downwardly by the springs 84. The lower leg 68' of the guard 68 is formed with a series of openings 72 along its length corresponding in spacing and number to the pins 56 of the header 52 for passage of the pins 56 through the openings 72 when the guard plate 68 moves upwardly relative to the bed pad 76 against the biasing force of the springs 84.

In operation of the L-sealing apparatus 10, the roll F of appropriate center-folded heat-shrinkable thermoplastic film is placed on the film dispenser 18 for rotational off-winding of film from the roll. The film roll F is positioned with the center fold thereof toward the rear side of the frame 12 and the two folded webs W1, W2 of the Film F at the leading edge of the film roll are separated with the lower web W1 passing beneath the panel 22 and the upper web W2 passing over the panel 22. An operator is thus enabled to easily insert an article A to be packaged between the webs W1, W2 by merely lifting the upper web portion W2 from the panel 22 and sliding the article A onto the panel 22 beneath the upper web. As will be understood, in the continuous operation of the apparatus 10, each sealing cycle will leave the leading edge of the film F with a transverse seal so that the film upon initiating each packaging cycle will already be joined transversely at the leading end thereof and along the center fold line. A suitable length of the film with the inserted article A between the webs W1, W2 is drawn manually by the operator toward and is placed on the conveyor belt 28 of the conveyor table 26 with the unjoined longitudinal and transverse extends of the lower and upper film webs W1, W2 adjacent the inserted article A being positioned on the L-shaped sealing bed assembly 38.

The operator next depresses actuating buttons 74 on the machine frame 12 to actuate the piston-and-cylinder 40 to drive downward pivotal movement of the sealing arm assembly 30 while at the same time energizing the electromagnets 34. When the sealing arm assembly 30 reaches its downward position adjacent the frame 12, the electromagnets 34 engage the armature disks 36 on the sealing arm assembly 30 to retain the sealing arm assembly 30 in such downward disposition. At the same time, the three piston-and-cylinder assemblies 94 supporting the sealing bed assembly 38 are actuated to elevate the sealing bed assembly 38 into abutment with the wire heating assemblies 32, 33 to clamp the webs W1, W2 of the thermoplastic film F therebetween and, thereupon, electrical current is supplied to the sealing wires 78 of the wire heating assemblies 32, 33 causing them to become heated to a sufficient temperature to effect heat sealing of the webs of the thermoplastic film together. After a predetermined time period, the electromagnets 34 are deenergized, the piston-and-cylinder assembly 40 is actuated to drive pivotal return movement of the sealing arm assembly 30 to its upward position, and the three piston-and-cylinder assemblies 94 associated with the sealing bed assembly 38 are operated to return it downwardly to its retracted position.

When the sealing bed assembly 38 and the sealing arm assembly 30 are brought into abutted web-clamping contact as above-described, the guard 80 is forced against the biasing effect of the springs 84 into a retracted position as shown in FIG. 2 to enable the sealing wires 78 to contact the seal pads 96. At the same time, the guard plate 68 is correspondingly retracted to project the pins 56 of the film perforation assembly 50 through the openings 72 in the guard leg 68' so that the pins 56 penetrate both webs W1, W2 of the film F and are received within the pin holes 66 in the cushion 60. In this manner, a series of small perforations are formed in each film web W1, W2 at a close spacing along the portion of the L-shaped seal line formed by the sealing wire 78 of the wire heating assembly 33 transversely between the fold line of the film F and the parallel longitudinal portion of the seal line formed by the wire heating assembly 32. Preferably, the pins 56 are spaced by the spacer elements 54 to be only approximately one-half inch laterally from the seal wire 78 of the wire heating assembly 33. In this manner, the perforations are insured to be closely adjacent the transverse portion of the seal line between the webs W1, W2 and, in turn, upon subsequent shrinkage of the film F about the article A, the perforations are insured to remain disposed at the lateral side of the article A than in the extent of the film F covering the top and bottom surfaces of the article A.

Thus, the film perforating assembly 50 of the present invention provides several important advantages. As will of course be understood, the perforations 50 perform the necessary function of enabling air captured between the film webs W1, W2 during the L-sealing operation to escape during subsequent shrinkage of the film F in a shrink tunnel or other suitable heat-shrinking machinery. The needle-like configuration of the pins 56 causes the perforations formed thereby to be of relatively small dimension to minimize passage of dirt, debris and the like through the perforations which may soil the article A. Importantly, the disposition of the perforating pins 56 on the sealing arm assembly 30 at a relatively close spacing to the sealing wire 78 insures, as above described, that the perforations are disposed at the side of the article A while the extent of the film webs W1, W2 covering the top and bottom surfaces of the article A are continuous and unperforated. Thus, as the film-enclosed article A passes through the shrink tunnel or other heat-shrinking machinery, little risk exists that dirt or debris will pass through the perforations and possibly soil the article A. Moreover, the perforations are also insured to remain at the side of the article A after the film F is fully shrunk so that, in subsequent stacking or packaging of the article A with other like articles A for shipment, storage or display and in all other handling of the article A, the possiblility remains minimal that dirt and debris may enter and soil the packaged article A through the perforations. As will be understood by those persons skilled in the art, these considerations are paramount in many industries, e.g., in the packaging of textile goods such as bed sheets and linens. As a result, the present apparatus enables a manufacturer to minimize unnecessary returns of soiled articles.

Furthermore, the location of the perforations along the transverse portion of the seal line additionally helps insure a uniform shrinkage of the film F about the article A in the heat-shrinking operation. Normally, the shrink tunnel or other heat-shrinking machine is arranged to follow in line the conveyor assembly 26 of the L-sealing apparatus 10 with the film-enclosed articles A being manually transferred directly from the conveyor belt 28 of the L-sealer 10 to the conveyor belt of the shrink tunnel without any change in disposition of the article. Thus, the film-enclosed article A passes through the shrink tunnel with the perforated transverse portion of the seal line at the trailing side of the film-enclosed article. As will thus be understood, with perforations formed in the film webs W1, W2 in accordance with the present invention, the air captured within the film is forced to flow to the trailing end of the article before escaping and, as such, the heat applied by the shrink tunnel to the film F is conveyed more rapidly to the trailing end of the film so that the shrinkage of the trailing portions of the film are not significantly delayed following initial shrinkage of the leading portions of the film. As an overall result, the film F shrinks to a substantially uniform degree over the entirety of the article A, lessening any risk that the film may separate at the seal lines.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude and such other embodiments, adaptations, variations, modifications and equivaltent arrangements, the present invention being limited only by the claims appended hereto and the equivalents thereof.

We claim:

1. In a sealing apparatus for heat-sealing together facing webs of shrinkable thermoplastic sheeting to enclose an article between the webs, said sealing apparatus including a pair of sheet clamping jaws, one of said jaws having sheet heating means, said jaws being relatively movable into and out of adjacent clamping relation for gripping the facing webs of the sheeting between said jaws and heat sealing the webs by said heating means along a seal line sidewise adjacent the article, the improvement comprising means mounted to one of said jaws for forming at least one perforation in at least one of the webs of the sheeting at a predetermined spacing from the seal line when said jaws are moved into clamping relation to permit escape of air when the sheeting is shrunk, said spacing being selected to dispose the perforation at the side of the article when the sheeting is shrunk to minimize passage through the perforation of dirt and the like which may soil the article.

2. The improvement in a heat sealing apparatus according to claim 1 and characterized further in that said perforation forming means is arranged to locate the perforation closely adjacent the seal line.

3. The improvement in a heat sealing apparatus according to claim 1 and characterized further in that said perforation forming means comprises a pin mounted to said one jaw for penetrating each web of the sheeting.

4. The improvement in a heat sealing apparatus according to claim 3 and characterized further in that said perforation forming means includes means mounted to the other said jaw for receiving the pin when said jaws are in clamping relation.

5. The improvement in a heat sealing apparatus according to claim 3 and characterized further in that said perforation forming means includes a cover mounted to said one jaw for movement between a guard position at least partially covering said pin when said jaws are out of clamping relation and a retracted position exposing said pin when said jaws are in clamping relation.

6. The improvement in a heat sealing apparatus according to claim 5 and characterized further in that said perforation forming means includes means biasing said cover into its said guard position.

7. The improvement in a heat sealing apparatus according to claim 3 and characterized further in that said perforation forming means includes a plurality of said pins arranged at spacings along said one jaw.

8. The improvement in a heat sealing apparatus according to claim 1 and characterized further in that said perforation forming means is arranged for forming a plurality of the perforations.

9. In a sealing apparatus of the L-sealer type for heat sealing together facing webs of a folded sheet of shrinkable thermoplastic film to enclose an article between the webs, said L-sealer apparatus including a pair of sheet clamping jaws, one said jaw having an L-shaped sealing bed and the other said jaw having a correspondingly L-shaped sheet heating means, one said jaw being movable relatively toward and away from the other jaw into and out of adjacent clamping relation for gripping the facing webs of the thermoplastic film between said jaws and heat sealing the webs by said heating means along an L-shaped seal line extending sidewise adjacent the article along a first extent opposite the fold and along a transverse extent between the fold and the first sealed extent, the improvement comprising means mounted to one of said jaws for forming at least one perforation in at least one of the webs of the thermoplastic film at a predetermined close spacing from the seal line when said jaws are moved into clamping relation to permit escape of air when the film is shrunk, said spacing being selected to dispose the perforation at the side of the article when the film is shrunk to minimize passage through the perforation of dirt and the like which may soil the article.

10. The improvement in an L-sealer apparatus according to claim 9 and characterized further in that said perforation forming means comprises a pin mounted to said one jaw for penetrating each web of the film.

11. The improvement in an L-sealer apparatus according to claim 10 and characterized further in that said perforation forming means includes means mounted to the other said jaw for receiving the pin when said jaws are in clamping relation.

12. The improvement in an L-sealer apparatus according to claim 10 and characterized further in that said perforation forming means includes a cover mounted to said one jaw for movement between a guard position at least partially covering said pin when said jaws are out of clamping relation and a retracted position exposing said pin when said jaws are in clamping relation.

13. The improvement in an L-sealer apparatus according to claim 12 and characterized further in that said perforation forming means includes means biasing said cover into its said guard position.

14. The improvement in an L-sealer apparatus according to claim 10 and characterized further in that said perforation forming means includes a plurality of said pins arranged at spacings along said one jaw.

15. The improvement in an L-sealer apparatus according to claim 9 and characterized further in that said perforation forming means is arranged for forming a plurality of the perforations.

16. The improvement in an L-sealer apparatus according to claim 9 and characterized further in that said perforation forming means is arranged to locate the perforation closely adjacent the transverse extent of the seal line.

* * * * *

UNITED STATES PATENT AND TRADEMARK OFFICE
CERTIFICATE OF CORRECTION

PATENT NO. : 5,015,325

DATED : May 14, 1991

INVENTOR(S) : Charles J. Bennett and Billy J. Simpson, Sr.

It is certified that error appears in the above-identified patent and that said Letters Patent is hereby corrected as shown below:

Column 1, Line 40, after "found" add -- in --.

Column 2, Line 58, reads "performation" but should read -- perforation --.

Column 4, Line 18, reads "converyor" but should read -- conveyor --.

Column 4, Line 55, reads "82"" but should read -- 82' --.

Column 6, Line 13, after "guard" add -- plate --.

Column 6, Line 42, reads "extends" but should read -- extents --.

Column 7, Line 28, after "A" add -- rather --.

Column 8, Line 42, reads "and" but should read -- any --.

Column 8, Line 43, reads "equivaltent" but should read -- equivalent --.

Signed and Sealed this

Fifteenth Day of December, 1992

*Attest:*

DOUGLAS B. COMER

*Attesting Officer*    Acting Commissioner of Patents and Trademarks